US012442532B2

(12) United States Patent
Yaras et al.

(10) Patent No.: US 12,442,532 B2
(45) Date of Patent: Oct. 14, 2025

(54) EXHAUST MIXER WITH PROTRUSIONS

(71) Applicant: PRATT & WHITNEY CANADA CORP., Longueuil (CA)

(72) Inventors: Metin Ilbay Yaras, Ottawa (CA); Mark Cunningham, Montreal-West (CA); Raja Ramamurthy, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/152,336

(22) Filed: Jan. 10, 2023

(65) Prior Publication Data

US 2024/0230089 A1    Jul. 11, 2024

(51) Int. Cl.
*F23R 3/02*    (2006.01)
*B01F 23/10*    (2022.01)
*B01F 25/10*    (2022.01)

(52) U.S. Cl.
CPC ................ *F23R 3/02* (2013.01); *B01F 23/10* (2022.01); *B01F 25/10* (2022.01)

(58) Field of Classification Search
CPC .. F23R 3/02; F23R 3/002; F23R 3/386; F23R 3/14; B01F 23/10; B01F 23/2132; B01F 23/232; B01F 23/19; B01F 23/41; B01F 23/45; B01F 23/50; B01F 25/10; B01F 25/3131; B01F 25/3141; B01F 25/23; B01F 25/102; B01F 25/3121; B01F 25/20; B01F 25/103; B01F 25/4331; B01F 25/25; B01F 25/2025; B01F 25/931; B01F 25/913; B01F 21/20; F05D 2220/32; F05D 2220/323;
(Continued)

(56) References Cited

U.S. PATENT DOCUMENTS 3,153,319 A * 10/1964 Young et al. ............. F02K 1/46
                                                      239/265.19
4,487,017 A    12/1984 Rodgers
(Continued)

FOREIGN PATENT DOCUMENTS

EP    1752649 A2    2/2007

OTHER PUBLICATIONS

European Search Report issued in counterpart EP application No. 24150955.3 on Jun. 7, 2024.

*Primary Examiner* — Dapinder Singh
(74) *Attorney, Agent, or Firm* — NORTON ROSE FULBRIGHT CANADA LLP

(57) ABSTRACT

An exhaust mixer assembly for a gas turbine engine includes a core passage extending along a central engine axis for directing a core gas flow. An outer annular passage coaxially surrounds the core passage for directing a bypass gas flow. An exhaust mixer communicating with the core passage and the outer annular passage has an upstream end, a downstream end and an annular wall extending therebetween. A plurality of protrusions extend axially from a downstream end of the annular wall to form a jagged trailing edge of the exhaust mixer. Each of the plurality of protrusions extend separately from the downstream end of the annular wall from the other of the plurality of protrusions. At least one of the plurality of protrusions is twisted about a protrusion axis extending through the at least one of the plurality of protrusions, the protrusion axis parallel to the central axis.

18 Claims, 3 Drawing Sheets

(58) Field of Classification Search
CPC .......... F05D 2220/36; F02C 9/18; F02C 6/08; F01D 5/14; F01D 5/141; B64D 33/04; B64D 27/10
See application file for complete search history.

(56) References Cited

U.S. PATENT DOCUMENTS

| | | | |
|---|---|---|---|
| 4,543,784 A | 10/1985 | Kirker | |
| 4,576,002 A | 3/1986 | Mavrocostas | |
| 5,291,672 A | 3/1994 | Brown | |
| 7,389,635 B2 | 6/2008 | Anderson et al. | |
| 7,827,802 B2 * | 11/2010 | Dussillols | F02K 1/383 60/770 |
| 8,104,260 B2 * | 1/2012 | Girgis | F02K 1/386 60/264 |
| 10,082,043 B2 * | 9/2018 | Lefebvre | F02K 1/48 |
| 2014/0260283 A1 * | 9/2014 | Bouchard | F02K 1/48 60/770 |
| 2015/0013341 A1 * | 1/2015 | Cunningham | F02K 1/48 60/39.5 |

* cited by examiner

EXHAUST MIXER WITH PROTRUSIONS

TECHNICAL FIELD

The disclosure relates generally to aircraft engines and, more particularly, to exhaust mixers for aircraft engines.

BACKGROUND

In turbofan engines, high velocity gases from the turbofan core is mixed with low velocity air from the bypass duct, and this core-bypass mixture is then exhausted from the engine. Turbofan engines generally use exhaust mixers in order to increase the mixing of the high and low velocity fluid flows and provide additional thrust. Various different configurations of exhaust mixers have been used in order to increase the mixing of the fluid flows. For instance, it is known to use lobed-shaped exhaust mixers in order to provide an increase in the mixing of the core and bypass fluid flows by creating vortices downstream of the mixer. Increased mixing of the high and low velocity flows increases the performance of turbofan engines.

However, there remains a need for improvement mixing solutions.

SUMMARY

In one aspect, there is provided an exhaust mixer assembly for a gas turbine engine, the exhaust mixer assembly comprising a core passage extending along a central axis of the gas turbine engine for directing a core gas flow, an outer annular passage coaxially surrounding the core passage for directing a bypass gas flow, and an exhaust mixer communicating with the core passage and the outer annular passage, the exhaust mixer having an upstream end, a downstream end and an annular wall extending therebetween, a plurality of protrusions extending axially from a downstream end of the annular wall to form a jagged trailing edge of the exhaust mixer, each of the plurality of protrusions extending separately from the downstream end of the annular wall from the other of the plurality of protrusions, at least one of the plurality of protrusions being twisted about a protrusion axis extending through the at least one of the plurality of protrusions, the protrusion axis parallel to the central axis.

In another aspect, there is provided a turbofan exhaust mixer comprising an annular wall extending around a central axis, the annular wall extending axially from an upstream end to a downstream end, the downstream end defining a trailing edge having a plurality of protrusions distributed about a circumference of the trailing edge and extending axially therefrom in a downstream direction, each of the plurality of protrusions extending separately from the downstream end of the annular wall from the other of the plurality of protrusions, at least one of the plurality of protrusions being twisted about a protrusion axis extending through the at least one of the plurality of protrusions, the protrusion axis parallel to the central axis.

In a further aspect, there is provided a method for operating a turbofan engine, comprising directing a core gas flow through a main gas path of the turbofan engine, directing a bypass gas flow through an annular bypass passage of the turbofan engine, mixing the core gas flow and the bypass gas flow at an exhaust mixer in fluid communication with the main gas path and the annular bypass passage, the exhaust mixer having an annular wall extending around a central axis of the turbofan engine, the annular wall extending axially from an upstream end to a downstream end, the downstream end defining a trailing edge having a plurality of protrusions distributed about a circumference of the trailing edge and extending axially therefrom in a downstream direction, each of the plurality of protrusions extending separately from the downstream end of the annular wall from the other of the plurality of protrusions, at least one of the plurality of protrusions being twisted about a protrusion axis extending through the at least one of the plurality of protrusions, the protrusion axis parallel to the central axis, and exhausting a mixture of the core gas flow and the bypass gas flow from the turbofan engine.

BRIEF DESCRIPTION OF THE DRAWINGS

Reference is now made to the accompanying figures in which.

DETAILED DESCRIPTION

Figure 1:
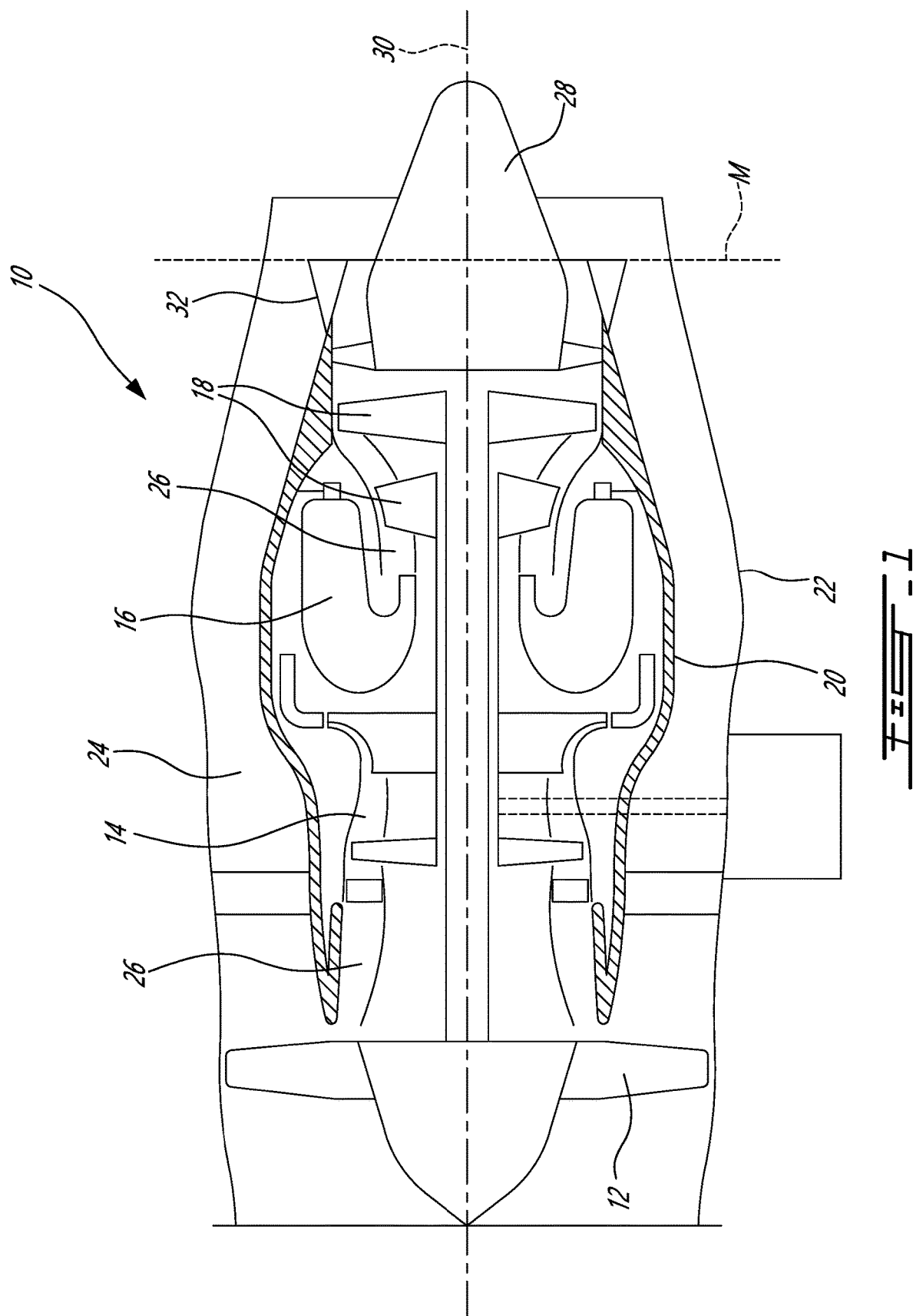
FIG. 1 is a schematic cross-sectional view of a gas turbine engine.

FIG. 1 illustrates a gas turbine engine 10 of a type preferably provided for use in subsonic flight, illustratively a long cowl turbofan engine, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a first casing 20 which encloses the turbo machinery of the engine, and a second, outer casing 22 extending outwardly of the first casing 20 such as to define an annular bypass passage 24 therebetween, also referred to as a bypass duct or an outer annular passage. The air propelled by the fan 12 is split into a first portion which flows around the first casing 20 within the bypass passage 24, and a second portion which flows through a main gas path 26, also referred to as a core passage, which is defined within the first casing 20 and allows the gas flow to circulate through the multistage compressor 14, combustor 16 and turbine section 18 as described above.

At the aft end of the engine 10, an axisymmetrical bullet 28 is centered on a longitudinal axis 30 (also referred to as the main axis) of the engine 10 and defines an inner wall of the main gas path 26 so that the combustion gases flow therearound. An annular exhaust mixer 32 surrounds at least a portion of the bullet 28, the mixer 32 acting as a rearmost portion of the outer wall defining the main gas path 26 and a rearmost portion of the inner wall defining the bypass passage 24. The hot combustion gases from the main gas path 26 and the cooler gas (i.e., air) from the bypass passage 24 are thus mixed together by the mixer 32 at the mixing plane M (generally located at the exit of the mixer 32) such as to produce an exhaust yielding a greater thrust. In a long cowl turbofan engine, the casing 22 extends beyond the mixing plane M, and often also beyond the trailing edge of bullet 28 (although the latter is not required). An exhaust mixer assembly may be said to include the exhaust mixer 32 and the downstream portions of the annular bypass passage 24 and the main gas path 26.

Figure 2:
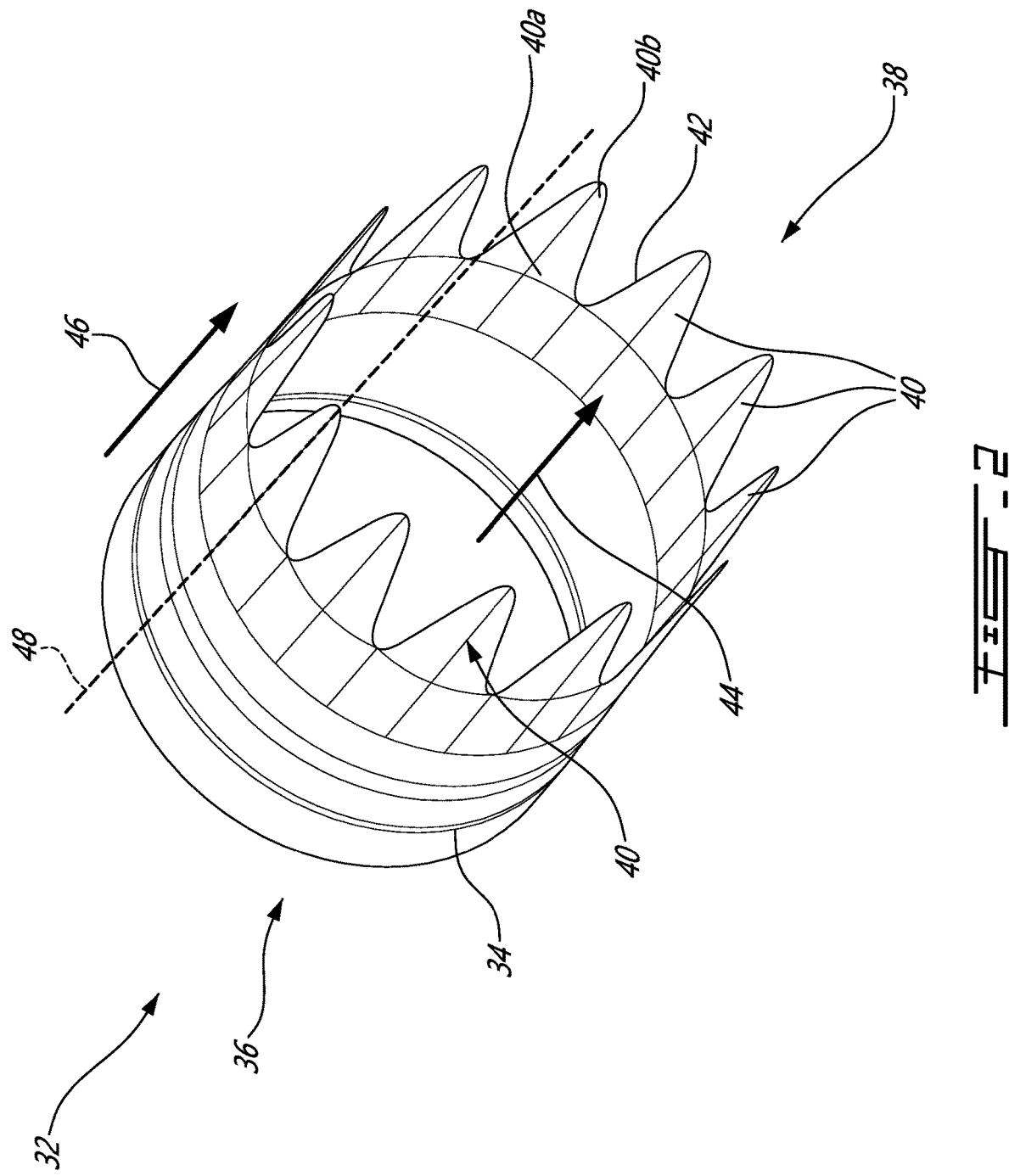
FIG. 2 is a side elevation view of an exhaust mixer for the engine of FIG. 1, according to an embodiment of the present disclosure.
Figure 3:
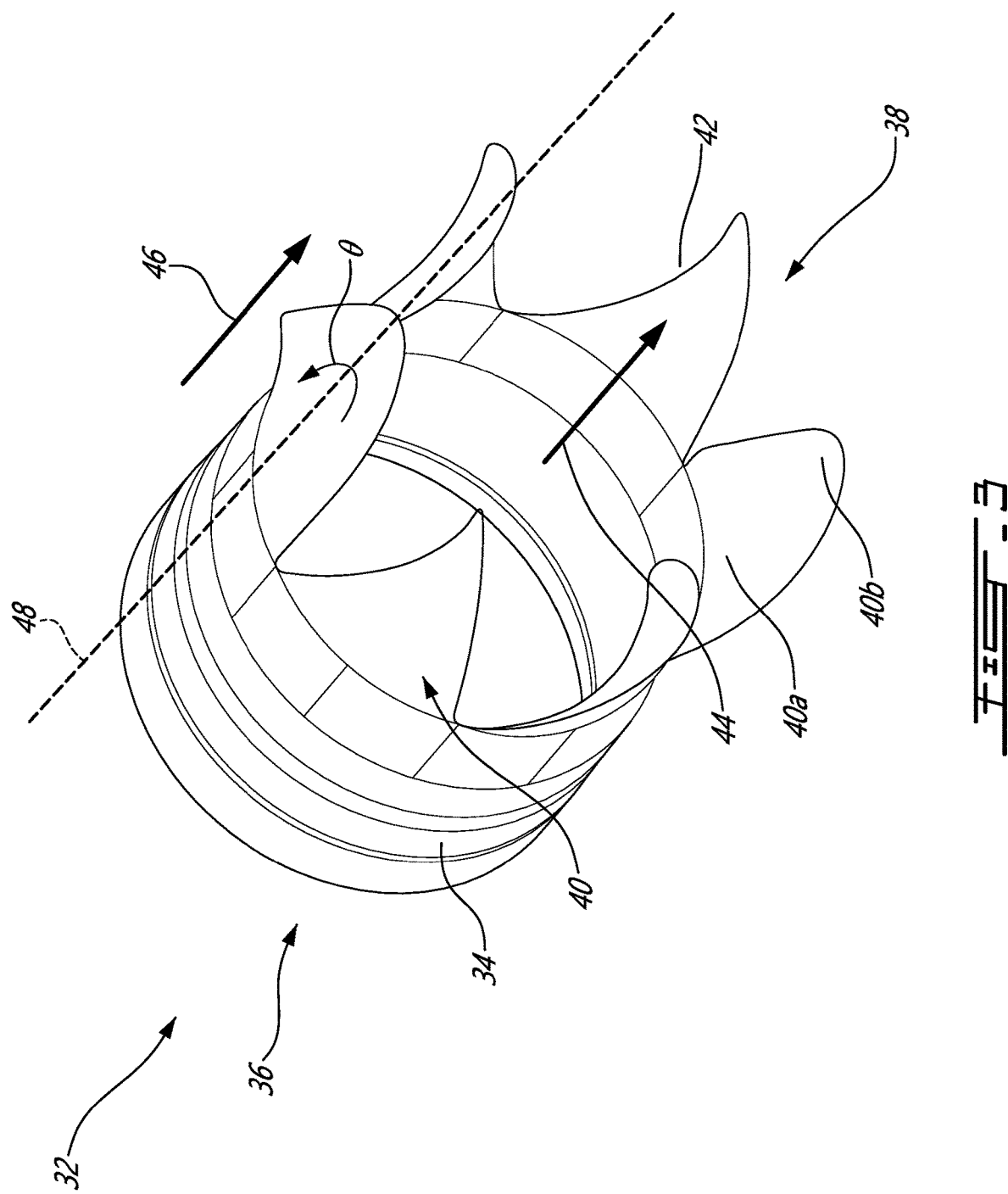
FIG. 3 is a side elevation view of an exhaust mixer for the engine of FIG. 1, according to another embodiment of the present disclosure.

Referring to FIGS. 2 and 3, the mixer 32 includes an annular wall 34 defining an upstream end 36 of the mixer 32 along which the flows from the main gas path 26 and from the bypass passage 24 are received, and a downstream end 38, i.e. trailing edge, where the two flows meet and are mixed together. Illustratively, the annular wall 34 has a consistent diameter along its axial length. Other shapes for the annular wall 34 may be contemplated, for instance the inclusion of a frustoconical portion along at least a part of its axial length.

At the downstream end 38, the annular wall 34 includes a plurality of axially-extending protrusions 40, also referred to as chevrons, thereby forming a jagged trailing edge 42 with the plurality of axially-extending protrusions 40 distributed at the distal end of the annular wall 34. Each of the protrusions 40 extends separately from the downstream end of the annular wall 34 from the other of the protrusions. Stated differently, unlike the lobes of a traditional lobbed mixer, in which the various lobes are interconnected along at least a part of their axial length, the protrusions 40 each extend axially in a distinct manner from the downstream end of the annular wall 34. The overall shape of the protrusions 40 of the mixer 32 promotes mixing between a core gas flow 44 flowing through the main gas path 26 and a bypass gas flow 46 flowing through the annular bypass passage 24.

To promote mixing between the core gas flow 44 and the bypass gas flow 46, each protrusion 40 may be rotated or twisted in a screw-like fashion about a respective protrusion axis 48. Such twisting may promote mixing, for instance, by deswirling the core flow 44 exiting from a final stage of the turbine section 18, and by assisting the penetration of the core flow 44 into the bypass flow 46 (or vice versa). In addition, each protrusion 40 may create a single streamwise vortex downstream of the mixer 32 to promote mixing of the core gas flow 44 and the bypass gas flow 46. As such, engine acoustics and performance (e.g., specific fuel consumption) may be improved. The strength (i.e., angular momentum) and sense of rotation of each streamwise vortex may be dictated by the extent (i.e., degrees) of axial twist of each protrusion 40, the axial rate of twist of each protrusion 40, and the direction of twist of the protrusion 40.

Each protrusion axis 48 passes through a center of a respective protrusion 40 in a direction parallel to the main longitudinal axis 30 of the engine 10 (see FIG. 1). As such, each protrusion 40 may be defined by a twist angle θ. In various embodiments, this twist angle θ may vary from 0 degrees (as shown in FIG. 2, i.e., no twist) to 90 degrees (as shown in FIG. 3). Other twist angles θ, for instance above 90 degrees, may be contemplated. In addition to the twist angle of each protrusion 40, the rate at which each protrusion 40 is twisted along its respective protrusion axis 48 may vary. This rate of twist may be fixed or may variable along a respective protrusion axis 48.

In various cases, the protrusions 40 may be twisted in a clockwise direction, counterclockwise direction, or combinations thereof. For instance, in case where the upstream flow is non-swirling, the protrusions 40 along the downstream end 38 of the mixer 32 may have different (e.g., alternating) directions of twist. By alternating the direction of twist, for example, counter-rotating streamwise vortices, created upon mixing of the core gas flow 44 and the bypass gas flow 46 downstream of the mixer 32, may be strengthened, thereby promoting stronger mixing of the flows.

In other cases, the oncoming gas flow towards the mixer 32 (e.g., the core flow 44) may have a swirling component to its velocity, and thus an angular momentum. To at least partially deswirl this flow (i.e., to at least reduce this angular momentum), an external torque is to be applied to the flow, preferably with minimal frictional dissipation. In cases where one or more protrusions 40 are twisted, their direction of twist may be selected to correspond to a direction of swirl in in the oncoming flow. As such, the twisted protrusions 40 may apply a torque onto the flow of gas in a direction opposite the gas's angular momentum, thereby reducing its angular momentum. As the twisted protrusion(s) 40 apply a tangential force onto the incoming gas, the twisted protrusion(s) 40 may also serve to efficiently deflect the incoming gas stream (for instance, the core flow 44) towards the co-flowing gas stream (for instance, the bypass flow 46), further enhancing mixing between the two flow streams.

In the shown cases, the protrusions 40 are shaped so that each protrusion edge acts as the trailing edge 42 of the mixer 32. Stated differently, when the upstream gas flow, i.e., the core flow 44 and the bypass flow 46, reach the protrusions 40 at the downstream end 38 of the mixer 32, the gases will first travel along the surfaces of the protrusions 50 before hitting the protrusion edges, thereby rendering each protrusion edge a trailing edge.

The number, size and shape of the protrusions 40 may vary. In the shown case, the mixer 32 includes twelve protrusions 40 extending axially from the downstream edge of the mixer 32 in a downstream direction. In other cases, the number of protrusions 40 may vary, for instance between four and twenty four protrusions 40. Preferably, the number of protrusions may vary from twelve to twenty protrusions 40. The circumferential width of each protrusion 40 may vary. In some cases, the width of the protrusions may be inversely correlated with the number of protrusions 40, i.e., a mixer may include a larger number of protrusions 40, each of a narrower width (or vice-versa). The axial length of each protrusion 40, i.e., from a protrusion base 40a to a protrusion tip 40b, may vary. The shape of the protrusions 40 may vary. In the shown case, the protrusions 40 are shaped as sinusoidal waves, although other shapes may be contemplated. In some cases, the sizes of protrusions (i.e., axial length and/or circumferential width) may vary from one protrusion 40 to another. In a preferred embodiment, the trailing edge 42 is axisymmetrically shaped about the longitudinal axis 30. Stated differently, the size, shape, and degree/direction of twist of the protrusion 40 is such that the trailing edge 42 is axisymmetrically-shaped about its circumference. As discussed above, the protrusions 40 extend axially in an individual manner relative to each, with no interconnection between protrusions 40 from each protrusion base 40a to protrusion tip 40b. In the shown case, protrusions 40 are only joined along the downstream end of the annular wall 34.

The size, shape, and degree/direction of twist of each protrusion 40 may be selected based on aerodynamic considerations (i.e., to optimize mixing of the incoming flows). In addition, these selections may be made to maximize stiffness of the mixer 32. As discussed above, twisted protrusions 40 may apply a torque on the incoming flows 44, 46. As such, the incoming flows 44, 46 may apply a corresponding torque against the protrusions 40 (i.e., in an attempt to "untwist" the protrusions). As such, the protrusions 40 may be shaped so that their circumferential width narrows from the protrusion base 40a to the protrusion tip 40b, thereby concentrating the exchange of torque at the wider protrusion base 40a. Other protrusion shapes may be contemplated. For instance, a thickness of each protrusion 40 may vary along a span and length of each protrusion 40. This variable thickness may allow a leading edge of each protrusion 40 to be rounded so that the flow may be de-swirled for a wide range of incoming swirl angles. Additionally, a variable thickness may allow the protrusions 40 to have different profiles on each of the bypass side and the core side.

In an embodiment, one or more struts (not shown) may be disposed in the main gas path 26 and/or the annular bypass passage 24. When implemented, one or more struts may swirl or de-swirl the flow though the main gas path 26 and/or the annular bypass passage 24 to further promote mixing of the core gas flow 44 and the bypass gas flow 46. Various numbers and shapes of struts may be contemplated. The extent of swirling or de-swirling realized with the struts may vary along a span of the struts to promote development of regions of streamwise vorticity that may promote mixing of the core gas flow 44 and the bypass gas flow 46 downstream of the exhaust mixer 32. In other cases, the strut(s) may be omitted.

According to an exemplary embodiment, there is taught a method for operating a turbofan engine 10. A core gas flow 44 is directed through a main gas path 26 of the turbofan engine 10. A bypass gas flow 46 is directed through an annular bypass passage 24 of the turbofan engine 10. The core gas flow 44 and the bypass gas flow 46 are mixed at an exhaust mixer 32 in fluid communication with the main gas path 26 and the annular bypass passage 24, the exhaust mixer 32 having an annular wall 34 extending around a central axis 30 of the turbofan engine 10, the annular wall 34 extending axially from an upstream end 36 to a downstream end 38, the downstream end 38 defining a trailing edge 42 having a plurality of protrusions 40 distributed about a circumference of the trailing edge 42 and extending axially therefrom in a downstream direction, at least one of the plurality of protrusions 40 being twisted about a protrusion axis 48 extending through the at least one of the plurality of protrusions 40, the protrusion axis 48 parallel to the central axis 30. A mixture of the core gas flow 44 and the bypass gas flow 46 is then exhausted from the turbofan engine 10.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust mixer assembly for a gas turbine engine, the exhaust mixer assembly comprising:
a core passage extending along a central axis of the gas turbine engine for directing a core gas flow;
an outer annular passage coaxially surrounding the core passage for directing a bypass gas flow; and
an exhaust mixer communicating with the core passage and the outer annular passage, the exhaust mixer having an upstream end, a downstream end and an annular wall extending therebetween, a plurality of protrusions extending axially from a downstream end of the annular wall to form a jagged trailing edge of the exhaust mixer, each of the plurality of protrusions extending from a protrusion base at the downstream end of the annular wall to a protrusion tip, each of the plurality of protrusions extending separately from the downstream end of the annular wall from the other of the plurality of protrusions such that there is an absence of interconnection between adjacent protrusions from each protrusion base to protrusion tip, at least one of the plurality of protrusions being twisted, from the protrusion base to the protrusion tip, about a protrusion axis extending through the at least one of the plurality of protrusions, the protrusion axis parallel to the central axis, the protrusion axis defining a center of rotation about which the at least one of the plurality of protrusions is twisted.

2. The exhaust mixer assembly as defined in claim 1, wherein the plurality of protrusions are twisted in a same direction relative to their respective protrusion axes.

3. The exhaust mixer assembly as defined in claim 2, wherein one of the core gas flow and the bypass gas flow is swirled in a swirl direction, and the same direction in which the plurality of protrusions are twisted is opposite to the swirl direction.

4. The exhaust mixer assembly as defined in claim 1, wherein the exhaust mixer comprises between four and twenty four of the plurality of protrusions.

5. The exhaust mixer assembly as defined in claim 4, wherein the exhaust mixer comprises between twelve and twenty of the plurality of protrusions.

6. The exhaust mixer assembly as defined in claim 1, wherein the at least one of the plurality of protrusions has a twist angle about the protrusion axis of less than or equal to ninety degrees.

7. The exhaust mixer assembly as defined in claim 1, wherein the trailing edge of the exhaust mixer is axisymmetrically shaped about the central axis.

8. The exhaust mixer assembly as defined in claim 1, wherein the plurality of protrusions are shaped as sinusoidal waves.

9. The exhaust mixer assembly as defined in claim 1, wherein each the plurality of protrusions has a circumferential width that narrows from the protrusion base towards the protrusion tip.

10. A turbofan exhaust mixer comprising an annular wall extending around a central axis, the annular wall extending axially from an upstream end to a downstream end, the downstream end defining a trailing edge having a plurality of protrusions distributed about a circumference of the trailing edge and extending axially therefrom in a downstream direction from a protrusion base to a protrusion tip, each of the plurality of protrusions extending separately from the downstream end of the annular wall from the other of the plurality of protrusions such that there is an absence of interconnection between adjacent protrusions from each protrusion base to protrusion tip, at least one of the plurality of protrusions being twisted, from the protrusion base to the protrusion tip, about a protrusion axis extending through the at least one of the plurality of protrusions, the protrusion axis parallel to the central axis, the protrusion axis defining a center of rotation about which the at least one of the plurality of protrusions is twisted.

11. The turbofan exhaust mixer as defined in claim 10, wherein the plurality of protrusions are twisted in a same direction relative to their respective protrusion axes.

12. The turbofan exhaust mixer as defined in claim 10, wherein the turbofan exhaust mixer comprises between four and twenty four of the plurality of protrusions.

13. The turbofan exhaust mixer as defined in claim 12, wherein the turbofan exhaust mixer comprises between twelve and twenty of the plurality of protrusions.

14. The turbofan exhaust mixer as defined in claim 10, wherein the at least one of the plurality of protrusions has a twist angle about the protrusion axis of less than or equal to ninety degrees.

15. The turbofan exhaust mixer as defined in claim 10, wherein the trailing edge of the turbofan exhaust mixer is axisymmetrically-shaped about the central axis.

16. The turbofan exhaust mixer as defined in claim 10, wherein the plurality of protrusions are shaped as sinusoidal waves.

17. The turbofan exhaust mixer as defined in claim 10, wherein each the plurality of protrusions has a circumferential width that narrows from the protrusion base towards the protrusion tip.

18. A method for operating a turbofan engine, comprising:
   directing a core gas flow through a main gas path of the turbofan engine;
   directing a bypass gas flow through an annular bypass passage of the turbofan engine;
   mixing the core gas flow and the bypass gas flow at an exhaust mixer in fluid communication with the main gas path and the annular bypass passage, the exhaust mixer having an annular wall extending around a central axis of the turbofan engine, the annular wall extending axially from an upstream end to a downstream end, the downstream end defining a trailing edge having a plurality of protrusions distributed about a circumference of the trailing edge and extending axially therefrom in a downstream direction from a protrusion base to a protrusion tip, each of the plurality of protrusions extending separately from the downstream end of the annular wall from the other of the plurality of protrusions such that there is an absence of interconnection between adjacent protrusions from each protrusion base to protrusion tip, at least one of the plurality of protrusions being twisted, from the protrusion base to the protrusion tip, about a protrusion axis extending through the at least one of the plurality of protrusions, the protrusion axis parallel to the central axis, the protrusion axis defining a center of rotation about which the at least one of the plurality of protrusions is twisted; and
   exhausting a mixture of the core gas flow and the bypass gas flow from the turbofan engine.

\* \* \* \* \*